United States Patent
Boyd et al.

(10) Patent No.: US 7,395,367 B2
(45) Date of Patent: Jul. 1, 2008

(54) METHOD USING A MASTER NODE TO CONTROL I/O FABRIC CONFIGURATION IN A MULTI-HOST ENVIRONMENT

(75) Inventors: William T. Boyd, Poughkeepsie, NY (US); Douglas M. Freimuth, New York, NY (US); William G. Holland, Cary, NC (US); Steven W. Hunter, Raleigh, NC (US); Renato J. Recio, Austin, TX (US); Steven M. Thurber, Austin, TX (US); Madeline Vega, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 40 days.

(21) Appl. No.: 11/260,618

(22) Filed: Oct. 27, 2005

(65) Prior Publication Data

US 2007/0097949 A1    May 3, 2007

(51) Int. Cl.
    *G06F 13/00* (2006.01)
(52) U.S. Cl. .................................. 710/316; 709/220
(58) Field of Classification Search ........... 710/31–317; 709/220, 222–224
    See application file for complete search history.

(56) References Cited

U.S. PATENT DOCUMENTS

| | | | |
|---|---|---|---|
| 5,257,353 A | 10/1993 | Blanck et al. | |
| 5,367,695 A | 11/1994 | Narad et al. | |

(Continued)

FOREIGN PATENT DOCUMENTS

WO    2006089914 A1    8/2006

OTHER PUBLICATIONS

U.S. Appl. No. 11/066,424, filed Feb. 25, 2005, Arndt et al.

(Continued)

*Primary Examiner*—Clifford H Knoll
(74) *Attorney, Agent, or Firm*—Duke W. Yee; Matthew W. Baca; James O. Skarsten

(57) ABSTRACT

A method is directed to use of a master root node, in a distributed computer system provided with multiple root nodes, to control the configuration of routings through an I/O switched-fabric. One of the root nodes is designated as the master root node or PCI Configuration Manager (PCM), and is operable to carry out the configuration while each of the other root nodes remains in a quiescent or inactive state. In one useful embodiment pertaining to a system of the above type, that includes multiple root nodes, PCI switches, and PCI adapters available for sharing by different root nodes, a method is provided wherein the master root node is operated to configure routings through the PCI switches. Respective routings are configured between respective root nodes and the PCI adapters, wherein each of the configured routings corresponds to only one of the root nodes. A particular root node is enabled to access each of the PCI adapters that are included in any configured routing that corresponds to the particular root node. At the same time, the master root node writes into a particular root node only the configured routings that correspond to the particular root node. Thus, the particular root node is prevented from accessing an adapter that is not included in its corresponding routings.

7 Claims, 6 Drawing Sheets

U.S. PATENT DOCUMENTS

| | | | |
|---|---|---|---|
| 5,960,213 | A | 9/1999 | Wilson |
| 6,061,753 | A | 5/2000 | Ericson |
| 6,662,251 | B2 | 12/2003 | Brock et al. |
| 6,769,021 | B1 | 7/2004 | Bradley et al. |
| 6,775,750 | B2 | 8/2004 | Krueger |
| 6,907,510 | B2 | 6/2005 | Bennett et al. |
| 7,036,122 | B2 | 4/2006 | Bennett et al. |
| 7,096,305 | B2 | 8/2006 | Moll |
| 7,174,413 | B2 | 2/2007 | Pettey et al. |
| 7,188,209 | B2 | 3/2007 | Pettey et al. |
| 7,194,538 | B1 * | 3/2007 | Rabe et al. ............... 709/224 |
| 2002/0188701 | A1 | 12/2002 | Brown et al. |
| 2003/0221030 | A1 | 11/2003 | Pontius et al. |
| 2004/0039986 | A1 | 2/2004 | Solomon et al. |
| 2004/0123014 | A1 | 6/2004 | Schaefer et al. |
| 2004/0172494 | A1 | 9/2004 | Pettey et al. |
| 2004/0210754 | A1 | 10/2004 | Barron et al. |
| 2004/0230709 | A1 | 11/2004 | Moll |
| 2004/0230735 | A1 | 11/2004 | Moll |
| 2005/0025119 | A1 | 2/2005 | Pettey et al. |
| 2005/0044301 | A1 | 2/2005 | Vasilevsky et al. |
| 2005/0102682 | A1 | 5/2005 | Shah et al. |
| 2005/0147117 | A1 | 7/2005 | Pettey et al. |
| 2005/0188116 | A1 | 8/2005 | Brown et al. |
| 2005/0228531 | A1 | 10/2005 | Genovker et al. |
| 2005/0270988 | A1 | 12/2005 | DeHaemer |
| 2006/0168361 | A1 | 7/2006 | Brown et al. |
| 2006/0179195 | A1 | 8/2006 | Sharma et al. |
| 2006/0184711 | A1 | 8/2006 | Pettey et al. |
| 2006/0195617 | A1 | 8/2006 | Arndt et al. |
| 2006/0206655 | A1 * | 9/2006 | Chappell et al. ............ 710/315 |
| 2006/0206936 | A1 | 9/2006 | Liang et al. |
| 2006/0212608 | A1 | 9/2006 | Arndt et al. |
| 2006/0212620 | A1 | 9/2006 | Arndt et al. |
| 2006/0212870 | A1 | 9/2006 | Arndt et al. |
| 2006/0230181 | A1 | 10/2006 | Riley |
| 2006/0230217 | A1 | 10/2006 | Moll |
| 2006/0242333 | A1 | 10/2006 | Johnsen et al. |
| 2006/0242352 | A1 | 10/2006 | Torudbakken et al. |
| 2006/0242354 | A1 | 10/2006 | Johnsen et al. |
| 2006/0253619 | A1 | 11/2006 | Torudbakken et al. |
| 2007/0019637 | A1 | 1/2007 | Boyd et al. |
| 2007/0027952 | A1 | 2/2007 | Boyd et al. |
| 2007/0097871 | A1 | 5/2007 | Boyd et al. |
| 2007/0097948 | A1 | 5/2007 | Boyd et al. |
| 2007/0097950 | A1 | 5/2007 | Boyd et al. |
| 2007/0101016 | A1 | 5/2007 | Boyd et al. |
| 2007/0136458 | A1 | 6/2007 | Boyd et al. |

OTHER PUBLICATIONS

U.S. Appl. No. 11/066,645, filed Feb. 25, 2005, Arndt et al.
U.S. Appl. No. 11/065,869, filed Feb. 25, 2005, Arndt et al.
U.S. Appl. No. 11/065,951, filed Feb. 25, 2005, Arndt et al.
U.S. Appl. No. 11/066,201, filed Feb. 25, 2005, Arndt et al.
U.S. Appl. No. 11/065,818, filed Feb. 25, 2005, Arndt et al.
U.S. Appl. No. 11/066,518, filed Feb. 25, 2005, Arndt et al.
U.S. Appl. No. 11/066,096, filed Feb. 25, 2005, Arndt et al.
U.S. Appl. No. 11/065,823, filed Feb. 25, 2005, Arndt et al.
U.S. Appl. No. 11/054,274, filed Feb. 9, 2005, Flood et al.
U.S. Appl. No. 11/055,850, filed Feb. 11, 2005, Bishop et al.
U.S. Appl. No. 11/054,889, filed Feb. 10, 2005, Frey et al.
U.S. Appl. No. 11/054,871, filed Feb. 10, 2005, Griswell et al.
U.S. Appl. No. 11/055,831, filed Feb. 11, 2005, Bishop et al.
U.S. Appl. No. 11/056,691, filed Feb. 11, 2005, Le et al.
U.S. Appl. No. 11/056,878, filed Feb. 12, 2005, Bishop et al.
U.S. Appl. No. 11/056,692, filed Feb. 11, 2005, Floyd et al.
U.S. Appl. No. 11/049,342, filed Feb. 2, 2005, Lloyd et al.
U.S. Appl. No. 11/053,529, filed Feb. 8, 2005, Flood et al.
U.S. Appl. No. 11/140,648, filed May 27, 2005, Mack et al.
U.S. Appl. No. 11/340,447, filed Jan. 26, 2006, Boyd et al.
U.S. Appl. No. 11/334,678, filed Jan. 18, 2006, Boyd et al.
U.S. Appl. No. 11/348,903, filed Feb. 7, 2006, Boyd et al.
U.S. Appl. No. 11/351,020, filed Feb. 9, 2006, Boyd et al.
U.S. Appl. No. 11/567,411, filed Dec. 6, 2006, Boyd et al.
U.S. Appl. No. 11/567,425, filed Dec. 6, 2006, Boyd et al.

* cited by examiner

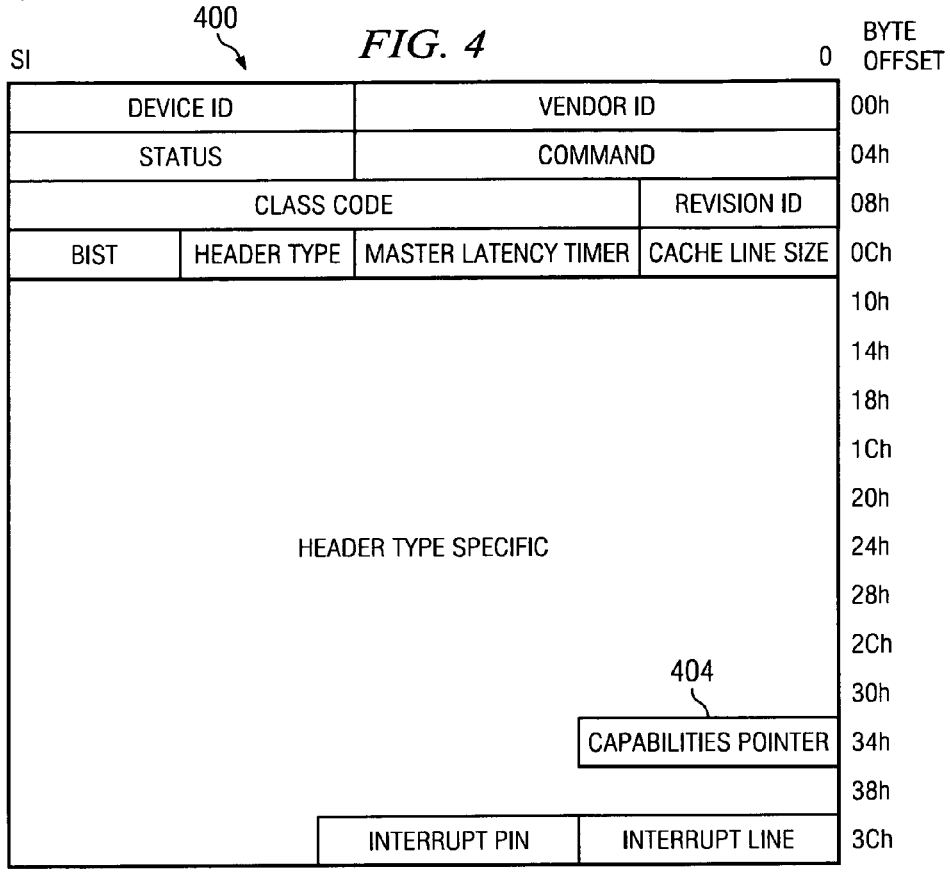
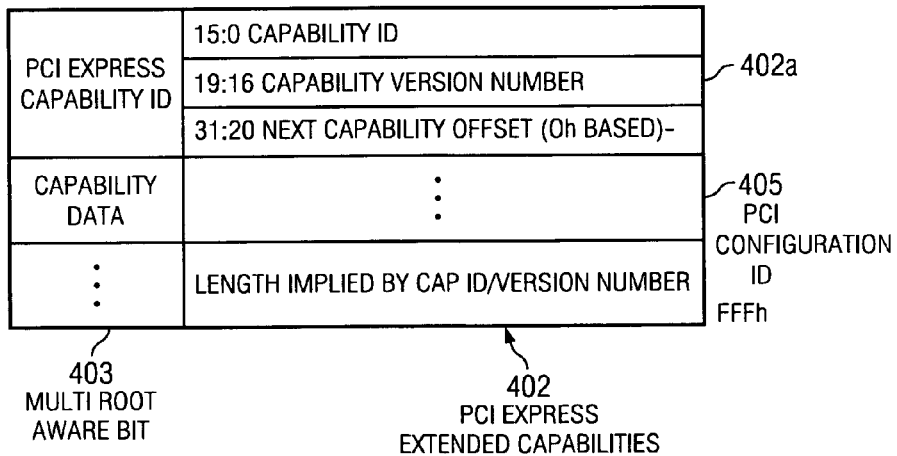
FIG. 4

METHOD USING A MASTER NODE TO CONTROL I/O FABRIC CONFIGURATION IN A MULTI-HOST ENVIRONMENT

BACKGROUND OF THE INVENTION

1. Field of the Invention

The invention disclosed and claimed herein generally pertains to a method and related apparatus for data transfer between multiple root nodes and PCI adapters, through an input/output (I/O) switched-fabric bus. More particularly, the invention pertains to a method of the above type wherein different root nodes may be routed through the I/O fabric to share the same adapter, so that it becomes necessary to provide a single control to configure the routing for all root nodes. Even more particularly, the invention pertains to a method of the above type wherein the routing configuration control resides in a specified one of the root nodes.

2. Description of the Related Art

As is well known by those of skill in the art, the PCI family (Conventional PCI, PCI-X, and PCIe) is widely used in computer systems to interconnect host units to adapters or other components, by means of an I/O switched-fabric bus or the like. However, the PCI family currently does not permit sharing of PCI adapters in topologies where there are multiple hosts with multiple shared PCI buses. As a result, even though such sharing capability could be very valuable when using blade clusters or other clustered servers, adapters for the PCI family and secondary networks (e.g., FC, IB, Enet) are at present generally integrated into individual blades and server systems. Thus, such adapters cannot be shared between clustered blades, or even between multiple roots within a clustered system.

In an environment containing multiple blades or blade clusters, it can be very costly to dedicate a PCI family adapter for use with only a single blade. For example, a 10 Gigabit Ethernet (10 GigE) adapter currently costs on the order of $6,000. The inability to share these expensive adapters between blades has, in fact, contributed to the slow adoption rate of certain new network technologies such as 10 GigE. Moreover, there is a constraint imposed by the limited space available in blades to accommodate PCI family adapters. This problem of limited space could be overcome if a PCI fabric was able to support attachment of multiple hosts to a single PCI family adapter, so that virtual PCI family I/O adapters could be shared between the multiple hosts.

In a distributed computer system comprising a multi-host environment or the like, the configuration of any portion of an I/O fabric that is shared between hosts, or other root nodes, cannot be controlled by multiple hosts. This is because one host might make changes that affect another host. Accordingly, to achieve the above goal of sharing a PCI family adapter amongst different hosts, it is necessary to provide a central management mechanism of some type. This management mechanism is needed to configure the routings used by PCI bridges and PCIe switches of the I/O fabric, as well as by the root complexes, PCI family adapters and other devices interconnected by the PCI bridges and PCIe switches.

It is to be understood that the term "root node" is used herein to generically describe an entity that may comprise a computer host CPU set or the like, and a root complex connected thereto. The host set could have one or multiple discrete CPU's. However, the term "root node" is not necessarily limited to host CPU sets. The term "root complex" is used herein to generically describe structure in a root node for connecting the root node and its host CPU set to the I/O fabric.

SUMMARY OF THE INVENTION

The invention is generally directed to use of a master root node, to control the configuration of routings through an I/O switched-fabric in a distributed computer system. While the root node designated as the master control, or PCI Configuration Manager (PCM), carries out the configuration, each of the other root nodes in the system remains in a quiescent or inactive state. In one useful embodiment of the invention, directed to a distributed computing system provided with multiple root nodes, and further provided with one or more PCI bridges and PCIe switches and one or more PCI family adapters available for sharing by different root nodes, a method is provided wherein one of the root nodes is initially designated to be the master root node. The master root node is operated to configure routings through the PCIe switches between respective root nodes and the PCI adapters, wherein each of the configured routings corresponds to only one of the root nodes. A particular root node is enabled to access any of the PCI family adapters included in the configured routings that respectively correspond to the particular root node. The term "routing", as used herein, refers to a specific path for data traffic that extends through one or more PCIe switches of the I/O fabric, from a root node to a PCI family adapter.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a schematic diagram depicting a PCI family configuration space adapted for use with an embodiment of the invention.

DETAILED DESCRIPTION OF THE PREFERRED EMBODIMENT

Figure 1:
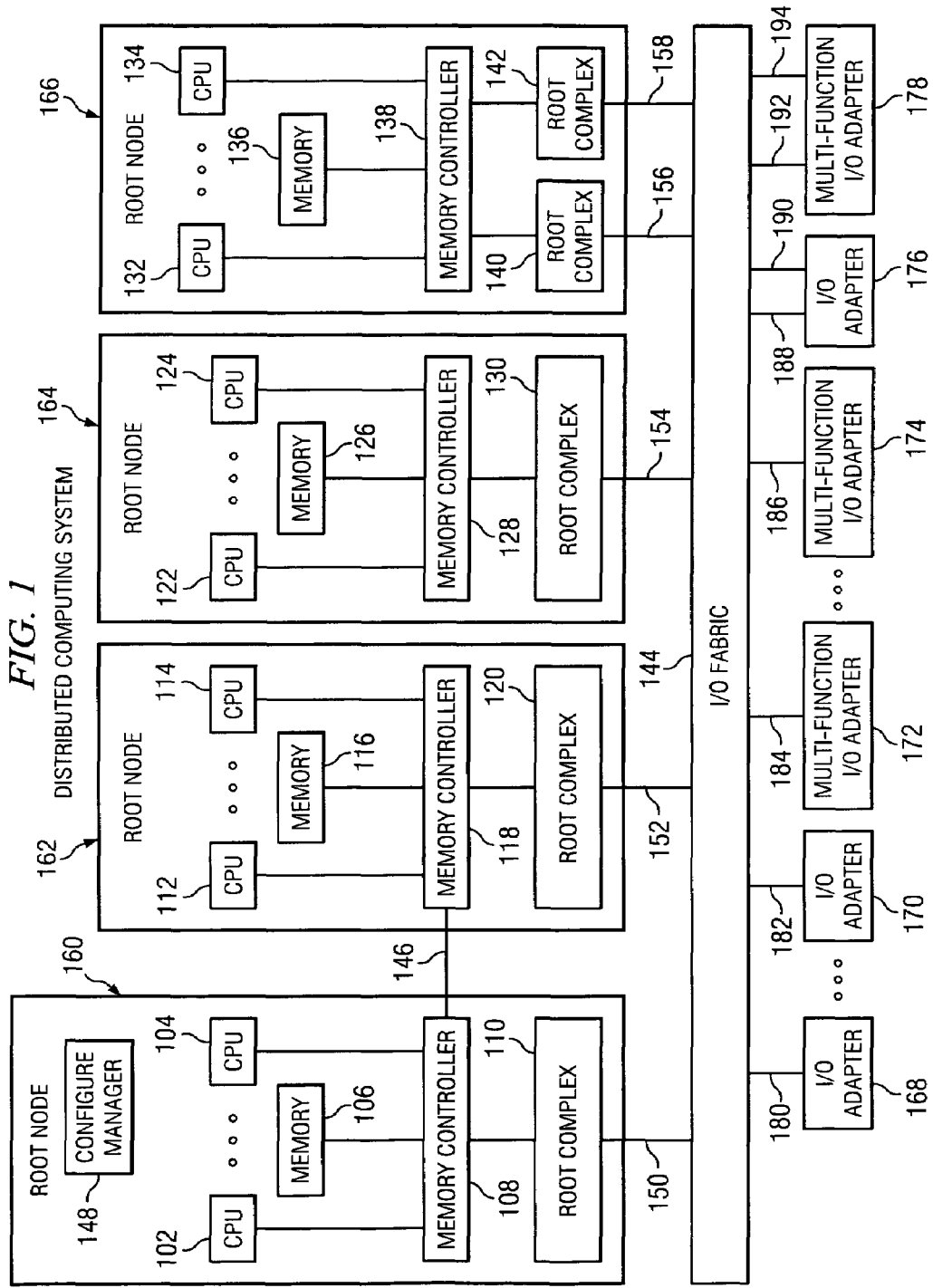
FIG. 1 is a block diagram showing a generic distributed computer system in which an embodiment of the invention may be implemented.

FIG. 1 shows a distributed computer system 100 comprising a preferred embodiment of the present invention. The distributed computer system 100 in FIG. 1 takes the form of multiple root complexes (RCs) 110, 120, 130, 140 and 142, respectively connected to an I/O fabric 144 through I/O links 150, 152, 154, 156 and 15, and to the memory controllers 108, 118, 128 and 138 of the root nodes (RNs) 160-166. The I/O fabric is attached to I/O adapters (IOAs) 168-178 through links 180-194. The IOAs may be single function, such as IOAs 168-170 and 176, or multiple function, such as IOAs 172-174 and 178. Moreover, respective IOAs may be connected to the I/O fabric 144 via single links, such as links 180-186, or with multiple links for redundancy, such as links 188-194.

The RCs 110, 120, and 130 are integral components of RN 160, 162 and 164, respectively. There may be more than one RC in an RN, such as RCs 140 and 142 which are both integral components of RN 166. In addition to the RCs, each RN consists of one or more Central Processing Units (CPUs) 102-104, 112-114, 122-124 and 132-134, memories 106, 116, 126 and 128, and memory controllers 108, 118, 128 and 138. The memory controllers respectively interconnect the CPUs, memory, and I/O RCs of their corresponding RNs, and perform such functions as handling the coherency traffic for respective memories.

RN's may be connected together at their memory controllers, such as by a link 146 extending between memory controllers 108 and 118 of RNs 160 and 162. This forms one coherency domain which may act as a single Symmetric Multi-Processing (SMP) system. Alternatively, nodes may be independent from one another with separate coherency domains as in RNs 164 and 166.

FIG. 1 shows a PCI Configuration Manager (PCM) 148 incorporated into one of the RNs, such as RN 160, as an integral component thereof. The PCM configures the shared resources of the I/O fabric and assigns resources to the RNs.

Distributed computing system 100 may be implemented using various commercially available computer systems. For example, distributed computing system 100 may be implemented using an IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
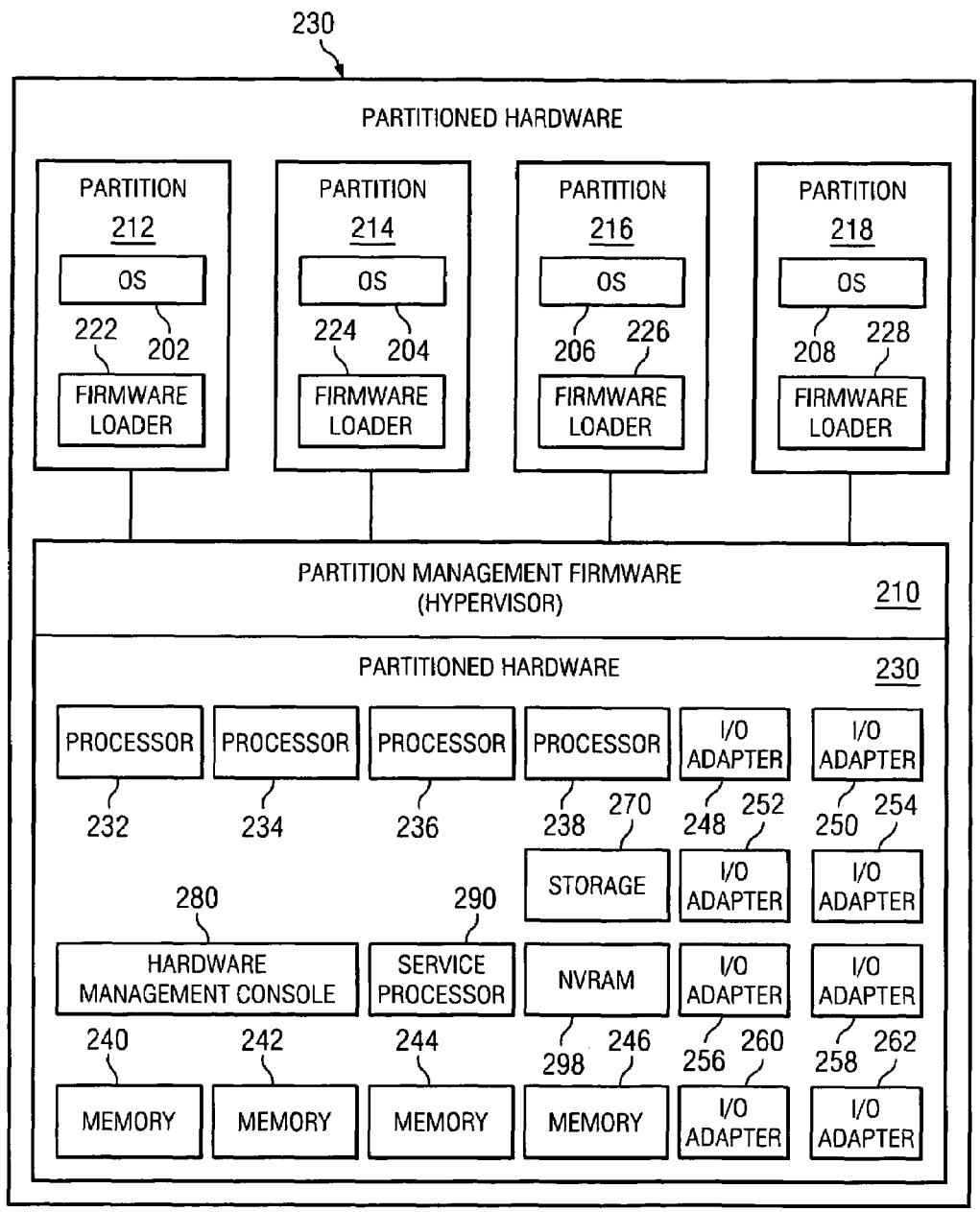
FIG. 2 is a block diagram showing an exemplary logical partitioned platform in the system of FIG. 1.

With reference to FIG. 2, a block diagram of an exemplary logical partitioned platform 200 is depicted in which the present invention may be implemented. The hardware in logically partitioned platform 200 may be implemented as, for example, data processing system 100 in FIG. 1. Logically partitioned platform 200 includes partitioned hardware 230, operating systems 202, 204, 206, 208 and hypervisor 210. Operating systems 202, 204, 206 and 208 may be multiple copies of a single operating system, or may be multiple heterogeneous operating systems simultaneously run on platform 200. These operating systems may be implemented using OS/400, which is designed to interface with a hypervisor. Operating systems 202, 204, 206 and 208 are located in partitions 212, 214, 216 and 218, respectively. Additionally, these partitions respectively include firmware loaders 222, 224, 226 and 228. When partitions 212, 214, 216 and 218 are instantiated, a copy of open firmware is loaded into each partition by the hypervisor's partition manager. The processors associated or assigned to the partitions are then dispatched to the partitions' memory to execute the partition firmware.

Partitioned hardware 230 includes a plurality of processors 232-238, a plurality of system memory units 240-246, a plurality of input/output (I/O) adapters 248-262, and a storage unit 270. Partition hardware 230 also includes service processor 290, which may be used to provide various services, such as processing of errors in the partitions. Each of the processors 232-238, memory units 240-246, NVRAM 298, and I/O adapters 248-262 may be assigned to one of multiple partitions within logically partitioned platform 200, each of which corresponds to one of operating systems 202, 204, 206 and 208.

Partition management firmware (hypervisor) 210 performs a number of functions and services for partitions 212, 214, 216 and 218 to create and enforce the partitioning of logically partitioned platform 200. Hypervisor 210 is a firmware implemented virtual machine identical to the underlying hardware. Hypervisor software is available from International Business Machines Corporation. Firmware is "software" stored in a memory chip that holds its content without electrical power, such as, for example, read-only memory (ROM), programmable ROM (PROM), electrically erasable programmable ROM (EEPROM), and non-volatile random access memory (NVRAM). Thus, hypervisor 210 allows the simultaneous execution of independent OS images 202, 204, 206 and 208 by virtualizing all the hardware resources of logically partitioned platform 200.

Operation of the different partitions may be controlled through a hardware management console, such as hardware management console 280. Hardware management console 280 is a separate distributed computing system from which a system administrator may perform various functions including reallocation of resources to different partitions.

In an environment of the type shown in FIG. 2, it is not permissible for resources or programs in one partition to affect operations in another partition. Moreover, to be useful, the assignment of resources needs to be fine-grained. For example, it is often not acceptable to assign all IOAs under a particular PHB to the same partition, as that will restrict configurability of the system, including the ability to dynamically move resources between partitions.

Accordingly, some functionality is needed in the bridges that connect IOAs to the I/O bus so as to be able to assign resources, such as individual IOAs or parts of IOAs to separate partitions; and, at the same time, prevent the assigned resources from affecting other partitions such as by obtaining access to resources of the other partitions.

Figure 3:
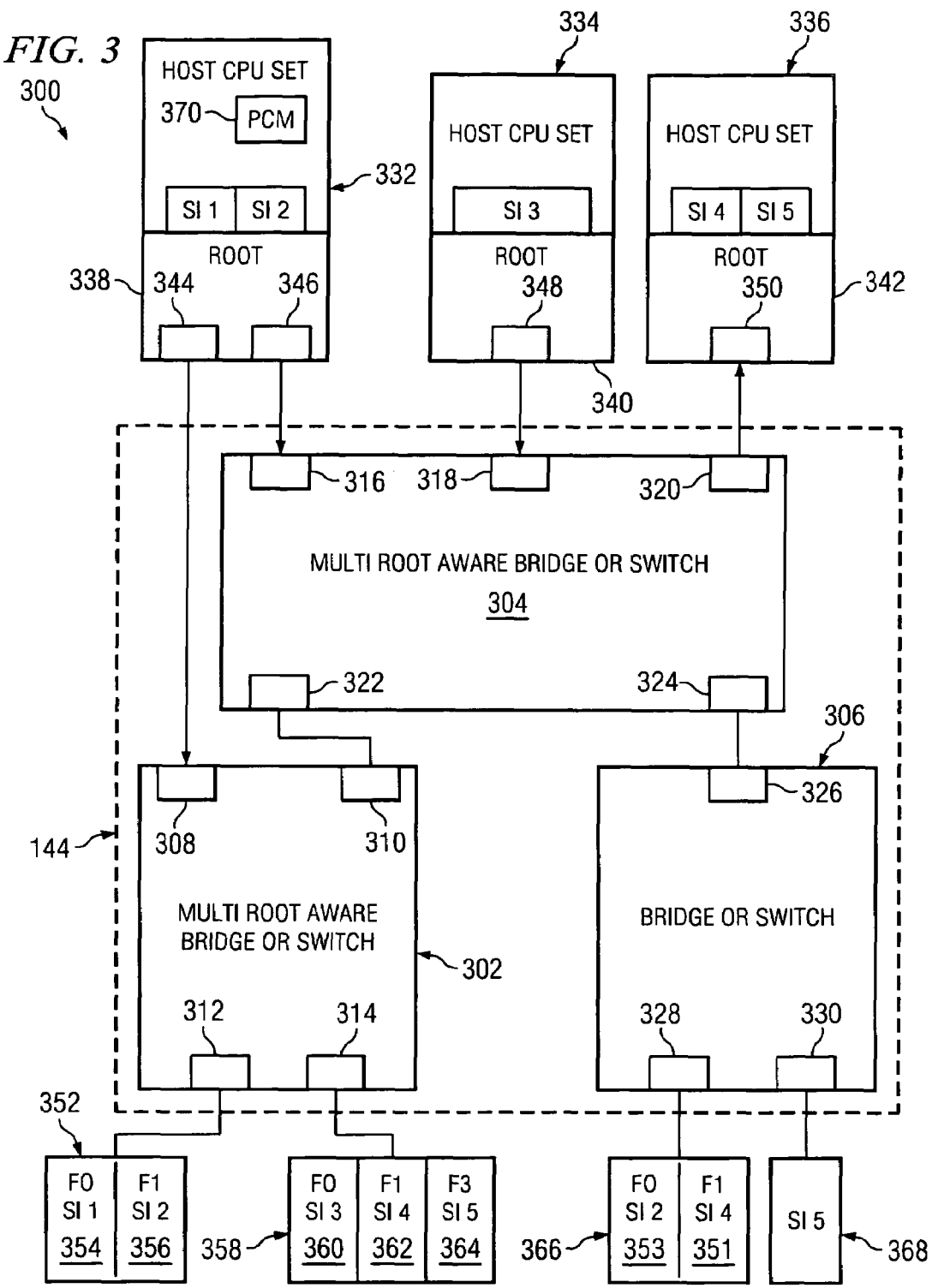
FIG. 3 is a block diagram showing a distributed computer system provided with multiple hosts and respective PCI family components that are collectively operable in accordance with an embodiment of the invention.

Referring to FIG. 3, there is shown a distributed computer system 300 that includes a more detailed representation of the I/O switched-fabric 144 depicted in FIG. 1. More particularly, to further illustrate the concept of a PCI family fabric that supports multiple root nodes through the use of multiple switches, fabric 144 is shown in FIG. 3 to comprise a plurality of PCIe switches (or PCI family bridges) 302, 304 and 306. FIG. 3 further shows switches 302, 304 and 306 provided with ports 308-314, 316-324 and 326-330, respectively. The switches 302 and 304 are referred to as multi-root aware switches, for reasons described hereinafter. It is to be understood that the term "switch", when used herein by itself, may include both switches and bridges. The term "bridge" as used herein generally pertains to a device for connecting two segments of a network that use the same protocol.

Referring further to FIG. 3, there are shown host CPU sets 332, 334 and 336, each containing a single or a plurality of system images (SIs). Thus, host 332 contains system image SI 1 and SI 2, host 334 contains system image SI 3, and host 336 contains system images SI 4 and SI 5. It is to be understood that each system image is equivalent or corresponds to a partition, as described above in connection with FIG. 2. Each of the host CPU sets has an associated root complex as described above, through which the system images of respective hosts interface with or access the I/O fabric 144. More particularly, host sets 332-336 are interconnected to RCs 338-342, respectively. Root complex 338 has ports 344 and 346, and root complexes 340 and 342 each has only a single port, i.e. ports 348 and 350, respectively. Each of the host CPU sets, together with its corresponding root complex, comprises an example or instance of a root node, such as RNs 160-166 shown in FIG. 1. Moreover, host CPU set 332 is provided with a PCM 370 that is similar or identical to the PCM 148 of FIG. 1.

FIG. 3 further shows each of the RCs 338-342 connected to one of the ports 316-320, which respectively comprise ports of multi-root aware switch 304. Each of the multi-root aware switches 304 and 302 provides the capability to configure a PCI family fabric such as I/O fabric 144 with multiple routings or data paths, in order to accommodate multiple root nodes.

Respective ports of a multi-root aware switch, such as switches 302 and 304, can be used as upstream ports, downstream ports, or both upstream and downstream ports. Generally, upstream ports are closer to the RC. Downstream ports are further from RC. Upstream/downstream ports can have characteristics of both upstream and downstream ports. In FIG. 3 ports 316, 318, 320, 326 and 308 are upstream ports. Ports 324, 312, 314, 328 and 330 are downstream ports, and ports 322 and 310 are upstream/downstream ports.

The ports configured as downstream ports are to be attached or connected to adapters or to the upstream port of another switch. In FIG. 3, multi-root aware switch 302 uses downstream port 312 to connect to an I/O adapter 352, which has two virtual I/O adapters or resources 354 and 356. Similarly, multi-root aware switch 302 uses downstream port 314 to connect to an I/O adapter 358, which has three virtual I/O adapters or resources 360, 362 and 364. Multi-root aware switch 304 uses downstream port 324 to connect to port 326 of switch 306. Multi-root aware switch 304 uses downstream ports 328 and 330 to connect to I/O adapter 366, which has two virtual I/O adapters or resources 353 and 351, and to I/O adapter 368, respectively.

Each of the ports configured as an upstream port is used to connect to one of the root complexes 338-342. Thus, FIG. 3 shows multi-root aware switch 302 using upstream port 308 to connect to port 344 of RC 338. Similarly, multi-root aware switch 304 uses upstream ports 316, 318 and 320 to respectively connect to port 346 of root complex 338, to the single port 348 of RC 340, and to the single port 350 of RC 342.

The ports configured as upstream/downstream ports are used to connect to the upstream/downstream port of another switch. Thus, FIG. 3 shows multi-root aware switch 302 using upstream/downstream port 310 to connect to upstream/downstream port 322 of multi-root aware switch 304.

I/O adapter 352 is shown as a virtualized I/O adapter, having its function 0 (F0) assigned and accessible to the system image SI 1, and its function 1 (F1) assigned and accessible to the system image SI 2. Similarly, I/O adapter 358 is shown as a virtualized I/O adapter, having its function 0 (F0) assigned and assessible to SI 3, its function 1 (F1) assigned and accessible to SI 4 and its function 3 (F3) assigned to SI 5. I/O adapter 366 is shown as a virtualized I/O adapter with its function F0 assigned and accessible to SI 2 and its function F1 assigned and accessible to SI 4. I/O adapter 368 is shown as a single function I/O adapter assigned and accessible to SI 5.

Referring to FIG. 4, there is shown a PCI configuration space for use with distributed computer system 300 or the like, in accordance with an embodiment of the invention. As is well known, each switch, bridge and adapter in a system such as data processing system 300 is identified by a Bus/Device/Function (BDF) number. The configuration space is provided with a PCI configuration header 400, for each BDF number, and is further provided with an extended capabilities area 402. Respective information fields that may be included in extended capabilities area 402 are shown in FIG. 4, at 402a. These include, for example, capability ID, capability version number and capability data. In addition, new capabilities may be added to the extended capabilities 402. PCI-Express generally uses a capabilities pointer 404 in the PCI configuration header 400 to point to new capabilities. PCI-Express starts its extended capabilities 402 at a fixed address in the PCI configuration header 400.

In accordance with the invention, it has been recognized that the extended capabilities area 402 can be used to determine whether or not a PCIe component is a multi-root aware PCIe component. More particularly, the PCI-Express capabilities 402 is provided with a multi-root aware bit 403. If the extended capabilities area 402 has a multi-root aware bit 403 set for a PCIe component, then the PCIe component will support the multi-root PCIe configuration as described herein. Moreover, FIG. 4 shows the extended capabilities area 402 provided with a PCI Configuration Manager (PCM) identification field 405. If a PCIe component supports the multi-root PCIe configuration mechanism, then it will also support PCM ID field 405.

Figure 5:
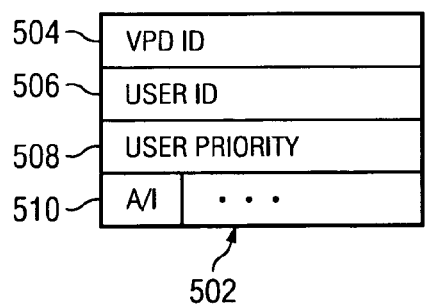
FIG. 5 is a schematic diagram showing an information space having fields pertaining to a PCM for the system of FIG. 3.

As stated above, host CPU set 332 is designated to include the PCI Configuration Manager (PCM) 370. FIG. 5 shows an information space 502 that includes information fields pertaining to the PCM host. More particularly, fields 504-508 provide the vital product data (VPD) ID, the user ID and the user priority ID respectively, for the PCM host 332. Field 510 shows an active rather than an inactive status, to indicate that the host CPU set associated with information space 502 is the PCM.

An important function of the PCM 370, after respective routings have been configured, is to determine the state of each switch in the distributed processing system 300. This is usefully accomplished by operating the PCM to query the PCI configuration space, described in FIG. 4, that pertains to each component of the system 300. This operation is carried out to provide system configuration information, while each of the other host sets remains inactive or quiescent. The configuration information indicates the interconnections of respective ports of the system to one another, and can thus be used to show the data paths, or routings, through the PCI family bridges and PCIe switches of a switched-fabric 144.

Figure 6:
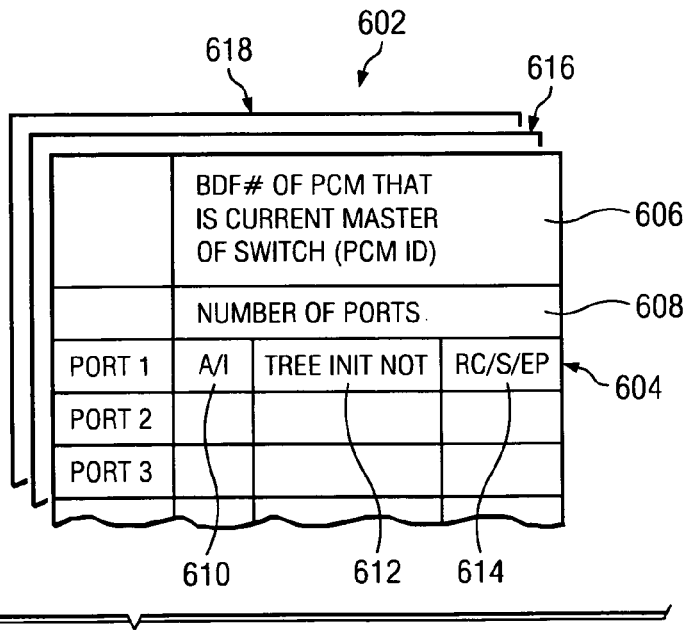
FIG. 6 is a schematic diagram showing components of a fabric table constructed by the PCM to provide a record of routings that have been configured or set up.

Referring to FIG. 6, there is shown a fabric table 602, which is constructed by the PCM as it acquires configuration information. The configuration information is usefully acquired by querying portions of the PCIe configuration space respectively attached to a succession of active ports (AP), as described hereinafter in connection with FIG. 7.

Referring further to FIG. 6, there is shown fabric table 602 including an information space 604 that shows the state of a particular switch in distributed system 300. Information space 604 includes a field 606, containing the identity of the current PCM, and a field 608 that indicates the total number of ports the switch has. For each port, field 610 indicates whether the port is active or inactive, and field 612 indicates whether a tree associated with the port has been initialized. Field 614 shows whether the port is connected to a root complex (RC), to a bridge or switch (S) or to an end point (EP).

FIG. 6 further shows fabric table 602 including additional information spaces 616 and 618, which respectively pertain to other switches or PCI components. While not shown, fabric table 602 in its entirety includes an information space similar to space 604 for each component of system 300. Fabric table 602 can be implemented as one table containing an information space for all the PCIe switches and PCI family components in the fabric; or as a linked list of tables, where each table contains the information space for a single PCIe switch or PCI family component. This table is created, managed, used, and destroyed by the PCM.

Figure 7:
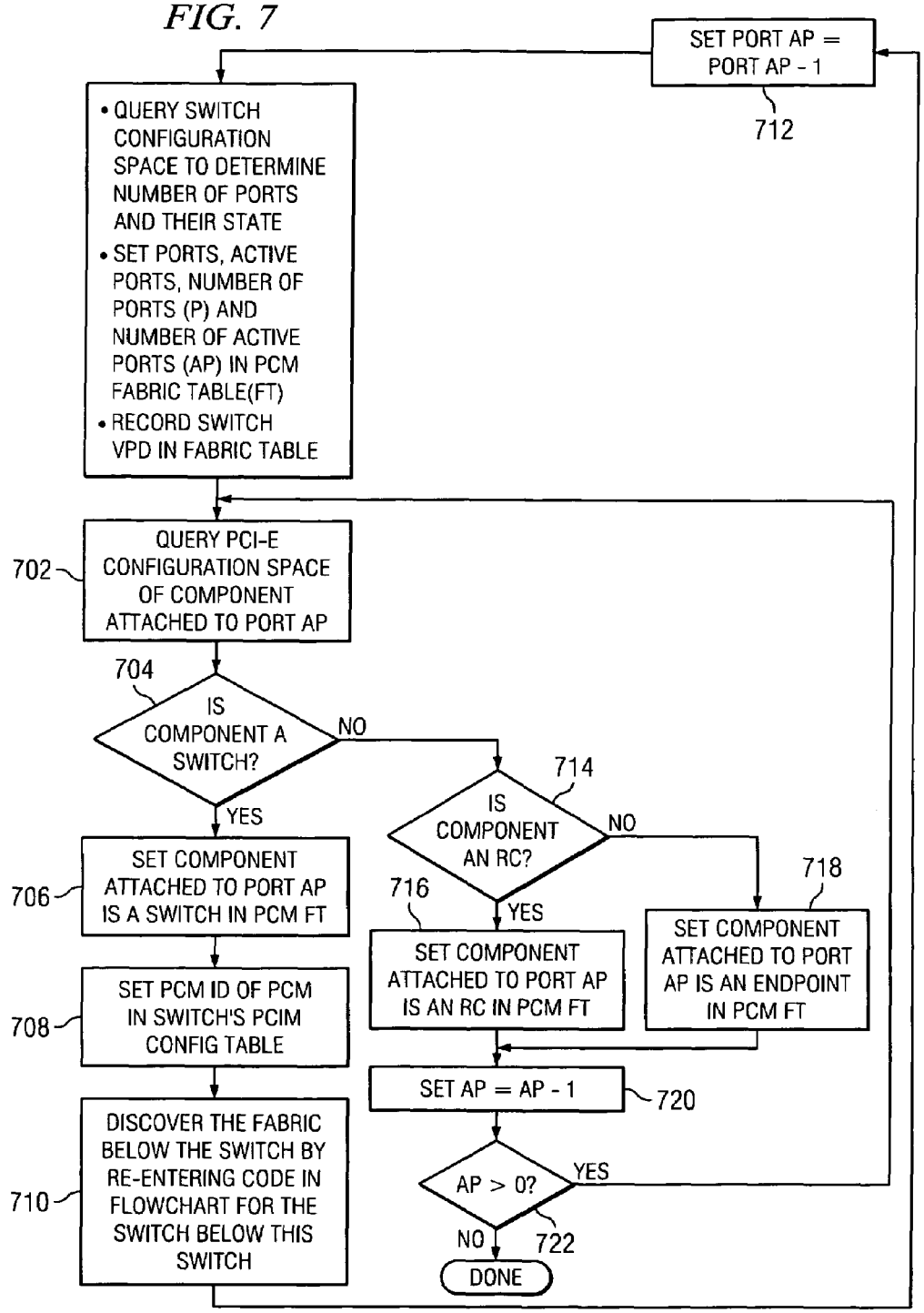
FIG. 7 is a flow chart depicting operation of the PCM in constructing the table of FIG. 6.

Referring to FIG. 7, there is shown a procedure usefully carried out by the PCM, in order to construct the fabric table 602. Generally, the PCM successively queries the PCI configuration space of each PCIe switch and other PCI family component. This is done to determine the number of ports a component has and whether respective ports are active ports (AP) or inactive ports. The PCM then records this information in the fabric table, together with the VPD of the PCI family component.

Function block 702 and decision block 704 indicate that the procedure of FIG. 7 begins by querying the configuration space to find out if the component attached to a port AP is a switch. Function block 706 shows that if the component is a switch, the field "Component attached to port (AP) is a switch" is set in the PCM fabric table. Moreover, the ID of the PCM is set in the PCM configuration table of the switch, in accordance with function block 708. This table is the information space in fabric table 602 that pertains to the switch. Function block 710 shows that the fabric below the switch is then discovered, by re-entering this algorithm for the switch below the switch of port AP in the configuration. Function block 712 discloses that the port AP is then set to port AP-1, the next following port, and the step indicated by function block 702 is repeated.

Referring further to FIG. 7, if the component is not a switch, it becomes necessary to determine if the component is a root complex or not, as shown by decision block 714. If this query is positive, the message "Component attached to port AP is an RC" is set in the PCM fabric table, as shown by function block 716. Otherwise, the field "Component attached to port AP is an end point" is set in the PCM fabric table, as shown by function block 718. In either event, the port AP is thereupon set to AP-1, as shown by function block 720. It then becomes necessary to determine if the new port AP value is greater than zero, in accordance with decision block 722. If it is, the step of function block 702 is repeated for the new port AP. If not, the process of FIG. 7 is brought to an end.

When the fabric table 602 is completed, the PCM writes the configured routing information that pertains to a given one of the host CPU sets into the root complex of the given host set. This enables the given host set to access each PCI adapter assigned to it by the PCM, as indicated by the received routing information. However, the given host set does not receive configured routing information for any of the other host CPU sets. Accordingly, the given host is enabled to access only the PCI adapters assigned to it by the PCM.

Usefully, the configured routing information written into the root complex of a given host comprises a virtual view comprising a subset of the tree representing the physical components of distributed computing system 300. The subset indicates only the PCIe switches, PCI family adapters and bridges that can be accessed by the given host CPU set. Each RC has a virtual switch information space table depicting the set of switch information spaces (604, 616, and 618) of table 602 that contains the PCI family components the RC is able to see in its virtual view. That is, the PCM manages a physical view of table 602 that contains all the physical components and a set of virtual views of table 602, one for each RC, which contains the virtual components seen by a given root. The preferred embodiment for communicating the virtual view associated with a given RC is for PCIe switches to pass a given RC's fabric configuration read requests to the PCM, so that the PCM can communicate the configuration response associated with that RC's virtual view. However, another approach would be to have each switch maintain a copy of the virtual views (e.g. 608) for all RCs that use the switch.

As a further feature, only the host CPU set containing the PCM is able to issue write operations, or writes. The remaining host CPU sets are respectively modified, to either prevent them from issuing writes entirely, or requiring them to use the PCM host set as a proxy for writes. The preferred embodiment for the latter is for PCIe switches to pass a given RC's fabric configuration write requests to the PCM, so that the PCM can prevent an RC from seeing more than that RC's virtual view. However, another approach would be to have each switch maintain a copy of the virtual views (e.g. 608) for all RCs that use the switch and have the switches prevent a given RC from seeing more than that RC's virtual view.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. In a distributed computing system provided with multiple root nodes, and further provided with one or more PCI switches and one or more PCI adapters that are available for accessing by different root nodes, a method comprising the steps of:

initially designating one of said root nodes to be master root node;

operating said master root node to configure routings through said PCI switches, each of said configured routings corresponding to only a single one of said root nodes, and each routing providing a path for data traffic between its corresponding root node and one of said PCI adapters;

enabling any particular root node to access only PCI switches and adapters which are included in configured routings that correspond to said any particular root node;

each root node includes a host CPU set, and a root complex comprising structure for connecting the root node to at least one of said PCI switches, so that each of said routings provides a path for data traffic between the root complex of its corresponding root node, and one of said PCI adapters;

only said master root node is enabled to issue write operations, and the master root node furnishes configured routing information to each of the remaining root nodes through its root complex, and thus enables the root complex of a remaining root node to access PCI switches and adapters indicated by its received routing information; and a plurality of options are made available for selection in order to respectively modify host CPU sets of said remaining root nodes, one of said options comprising modifying said host CPU sets of said remaining root nodes to direct them to use the master root node as a proxy for write operations, and another of said options comprising modifying said host CPU sets of said remaining root nodes to prevent them from issuing write operations.

2. The method of claim 1, wherein:

said routings are configured by said master root node during a time when the remaining root nodes are respectively in a quiescent state.

3. The method of claim 1, wherein:

said master root node furnishes said particular root node with configured routing information that pertains only to routings that respectively correspond to said particular root node.

4. The method of claim 1, wherein:

said distributed computing system includes PCI bridges.

5. The method of claim 4, wherein:

the configured routing information furnished to said particular root node comprises a subset of a tree representing physical components of said distributed computing system, wherein the subset indicates only the PCI switches, adapters and bridges that can be accessed by said particular root node.

6. The method of claim 1, wherein:

said master root node sets up a table for allowing each of said remaining root nodes to perform write operations only to PCI switches and adapters included in their respectively corresponding configured routings.

7. The method of claim 1, wherein:

said PCI switches collectively comprise an I/O fabric.

* * * * *